May 24, 1966 K. R. SCHNEIDER 3,252,849
LABEL APPLYING MACHINE
Filed Jan. 5, 1961 11 Sheets-Sheet 1

INVENTOR.
KURT R. SCHNEIDER
BY
Mason, Porter, Diller & Stewart
ATTORNEYS

May 24, 1966    K. R. SCHNEIDER    3,252,849
LABEL APPLYING MACHINE
Filed Jan. 5, 1961    11 Sheets-Sheet 2
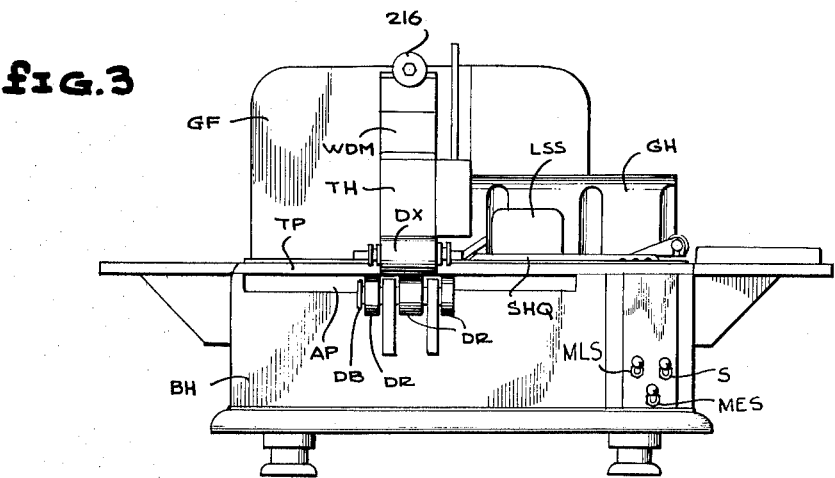
fig.3
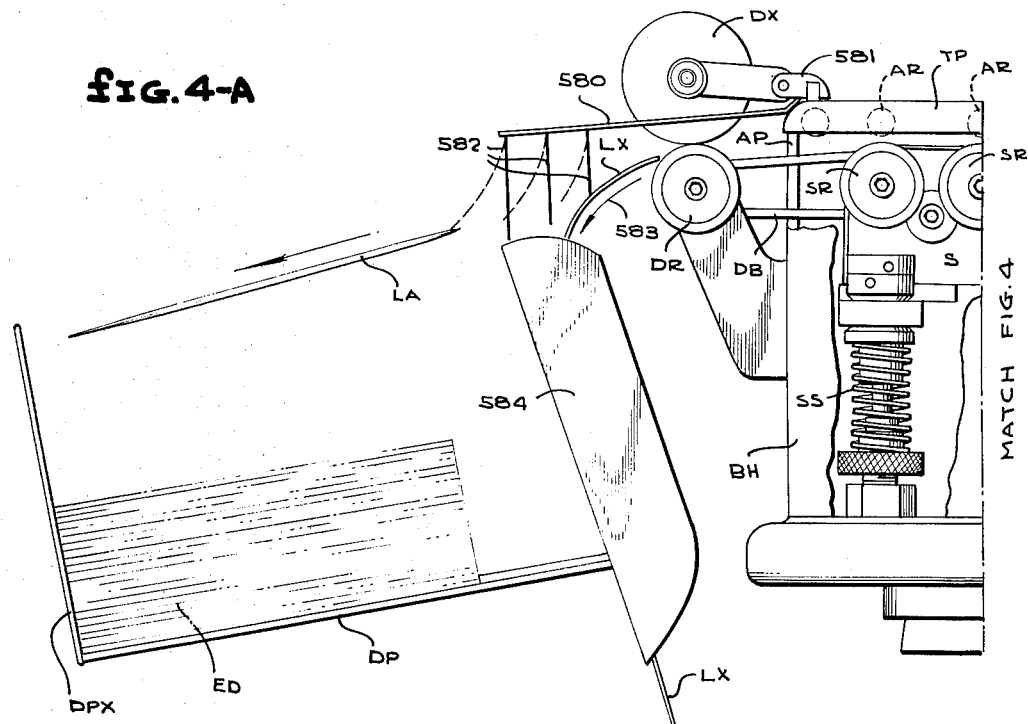
fig.4-A
INVENTOR.
KURT R. SCHNEIDER
BY
Mason, Porter, Diller & Stewart
ATTORNEYS

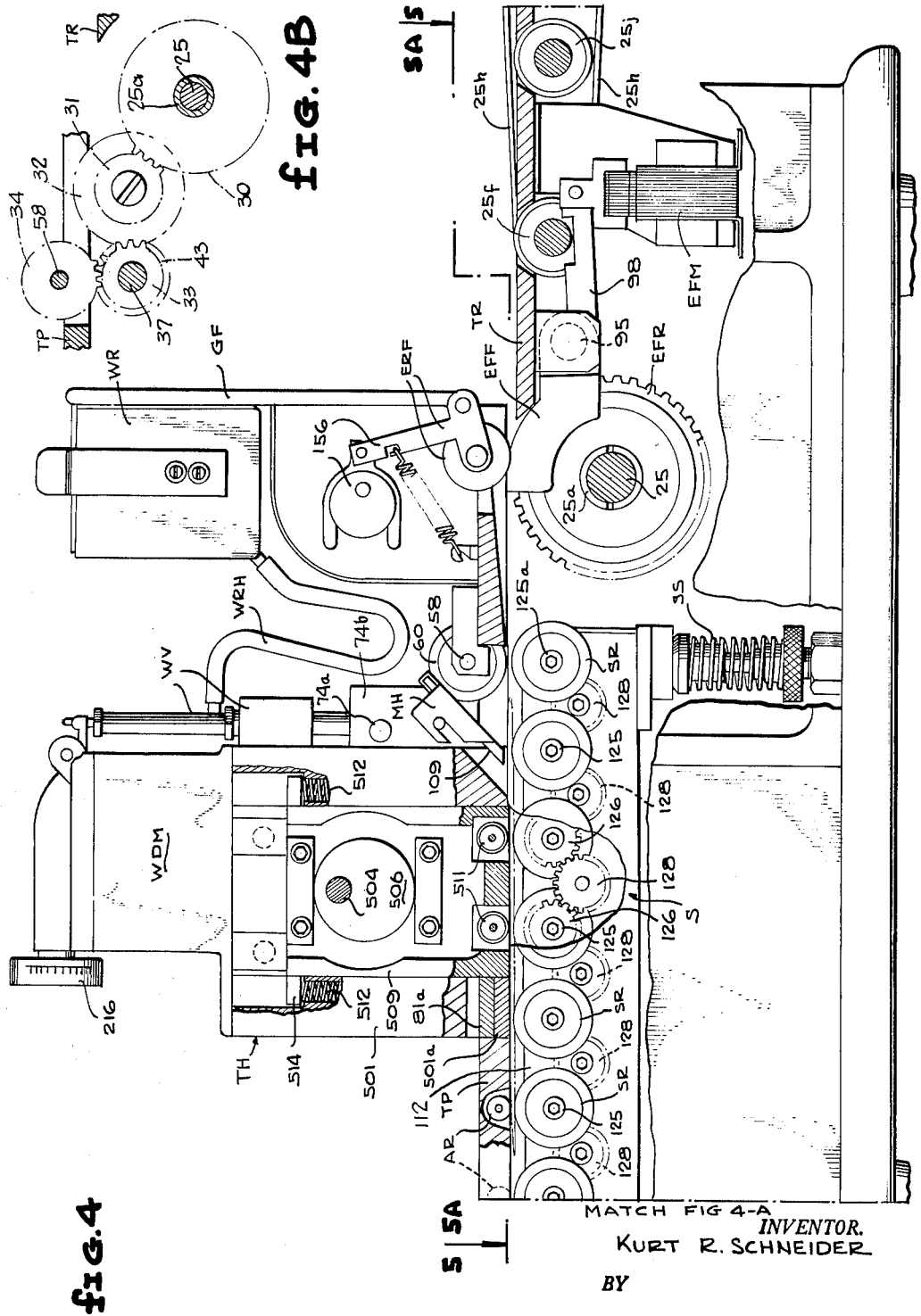

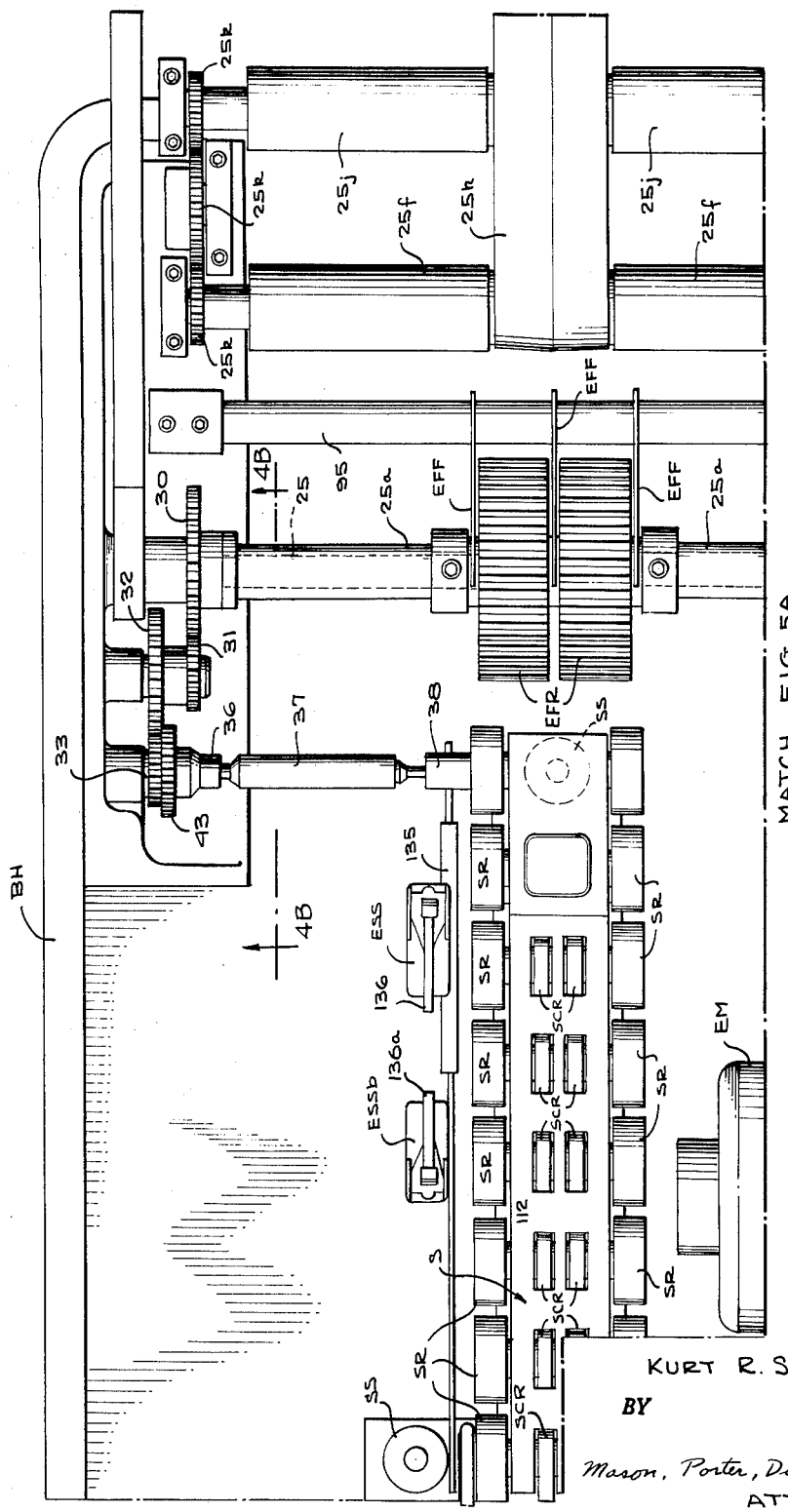

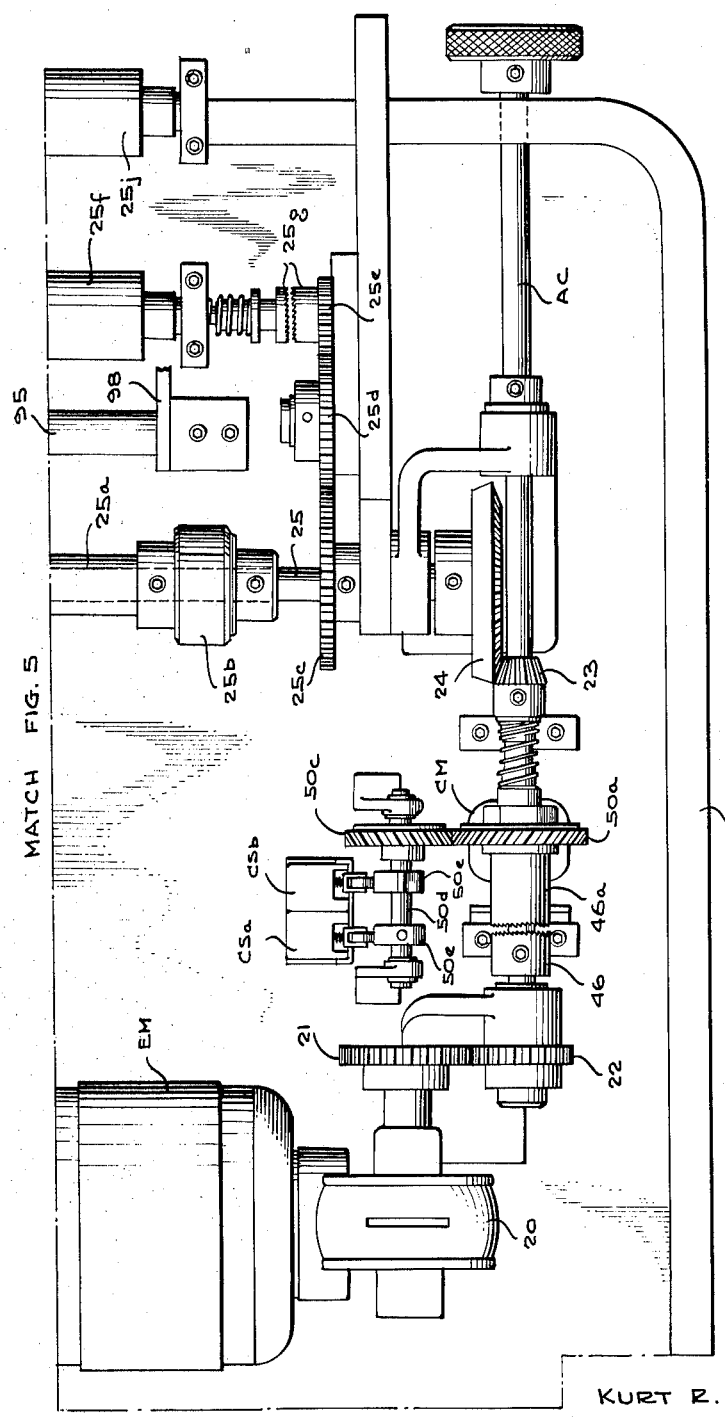

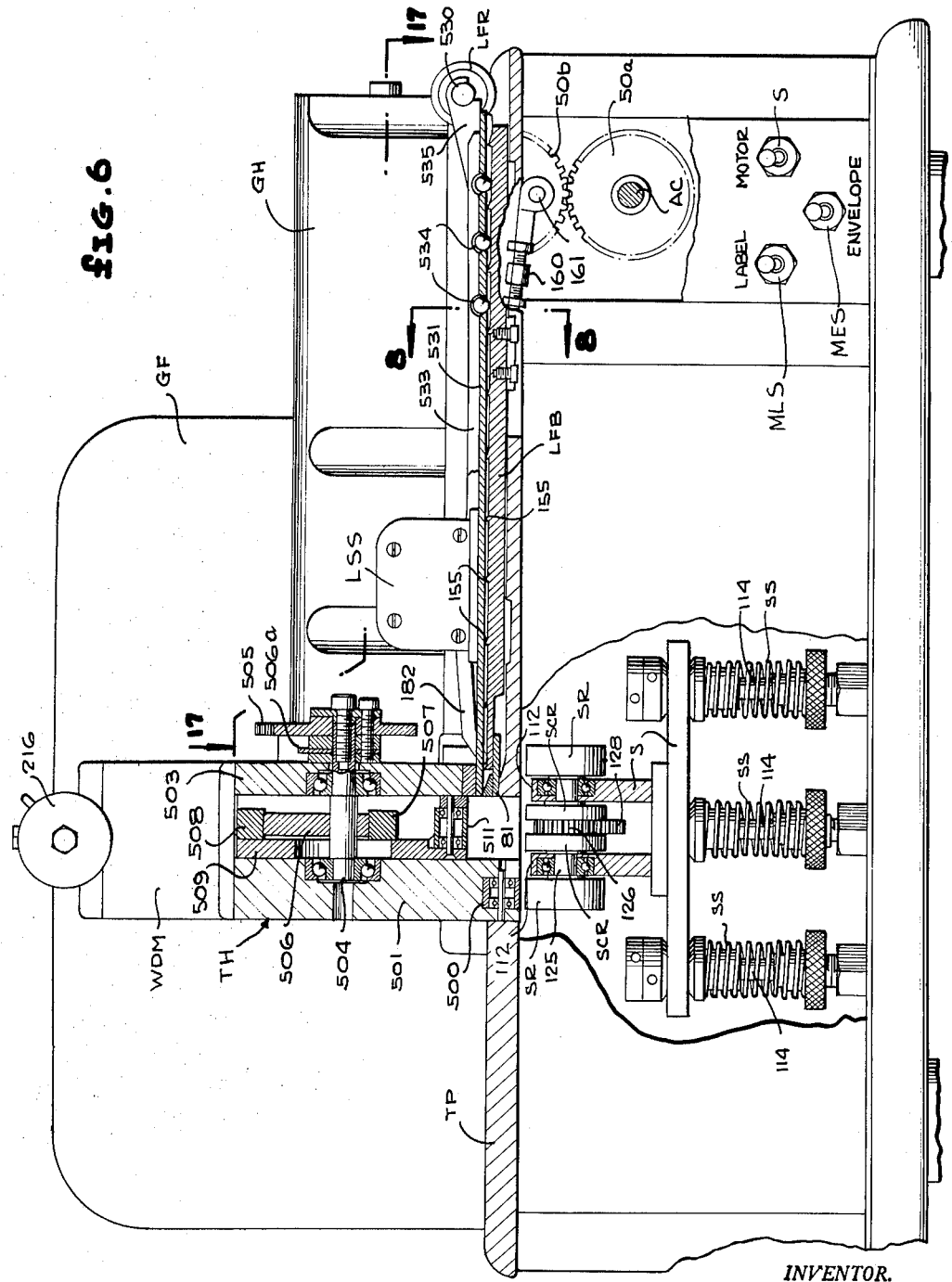

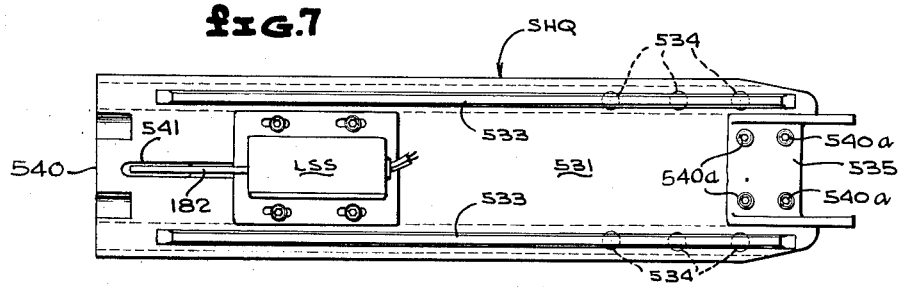
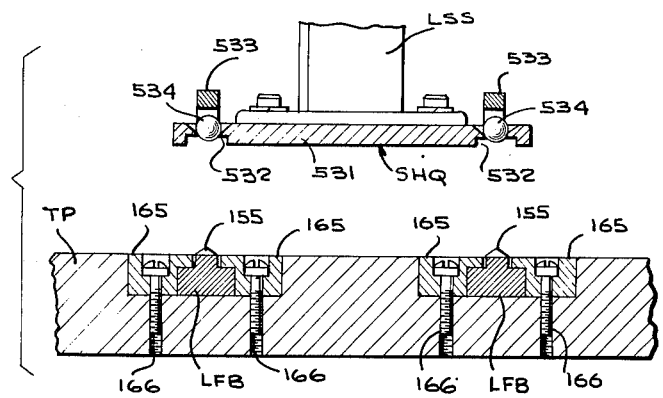
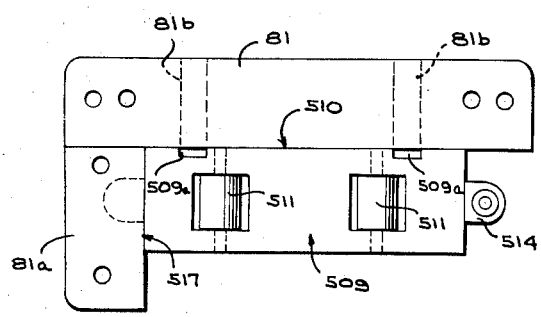
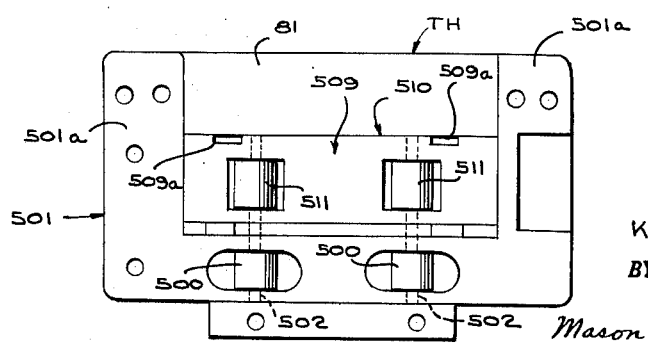

May 24, 1966   K. R. SCHNEIDER   3,252,849
LABEL APPLYING MACHINE
Filed Jan. 5, 1961   11 Sheets-Sheet 8
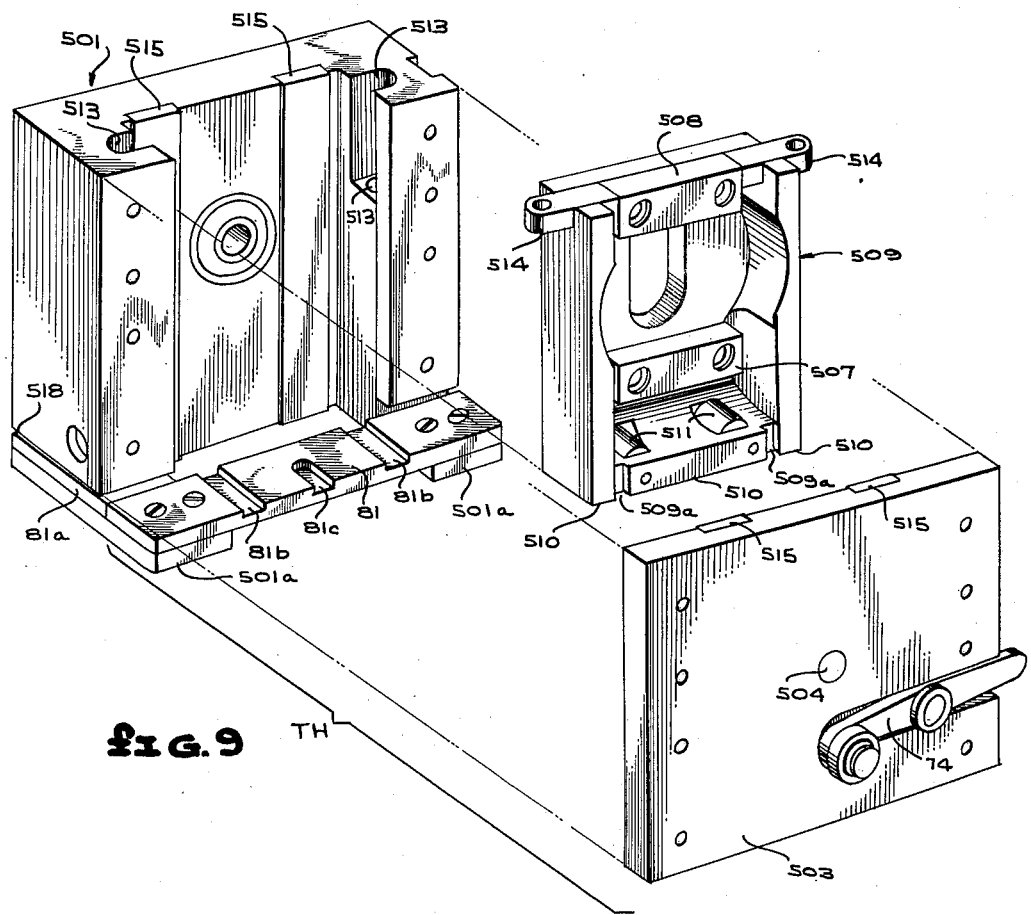
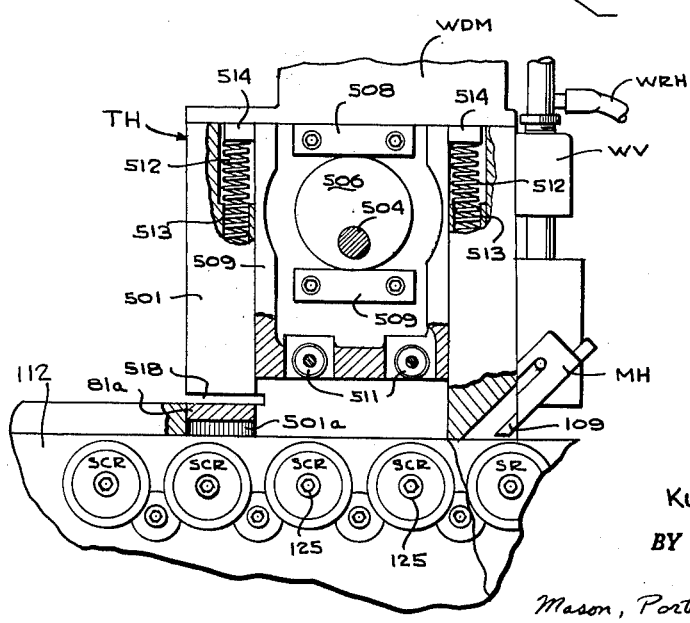
INVENTOR.
KURT R. SCHNEIDER
BY
Mason, Porter, Diller & Stewart
ATTORNEYS May 24, 1966  K. R. SCHNEIDER  3,252,849
LABEL APPLYING MACHINE
Filed Jan. 5, 1961  11 Sheets-Sheet 9
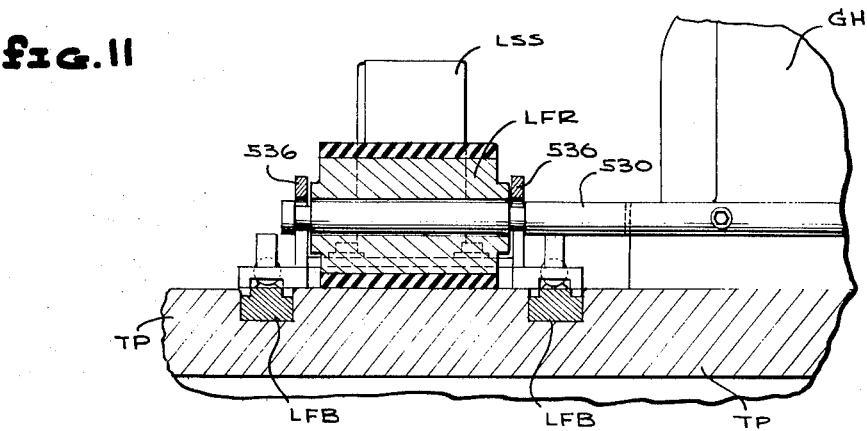
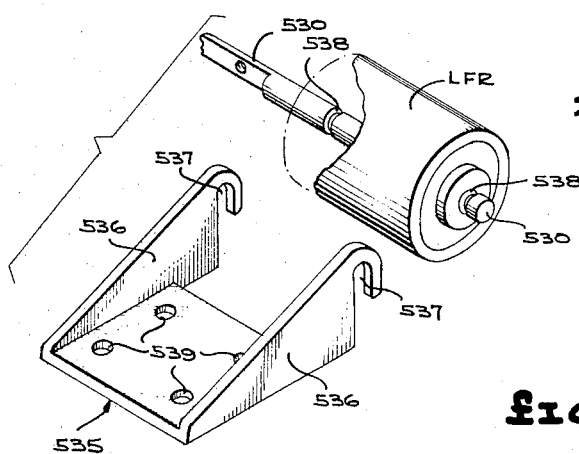
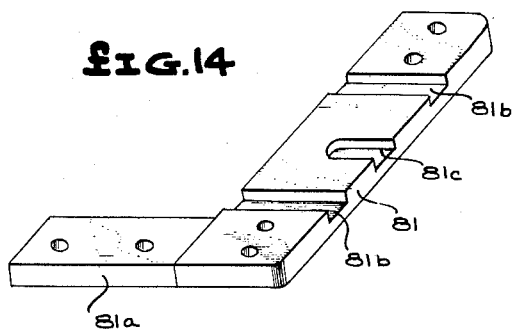
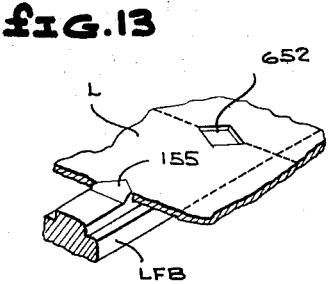
INVENTOR.
KURT R. SCHNEIDER
BY
Mason, Porter, Diller & Stewart
ATTORNEYS

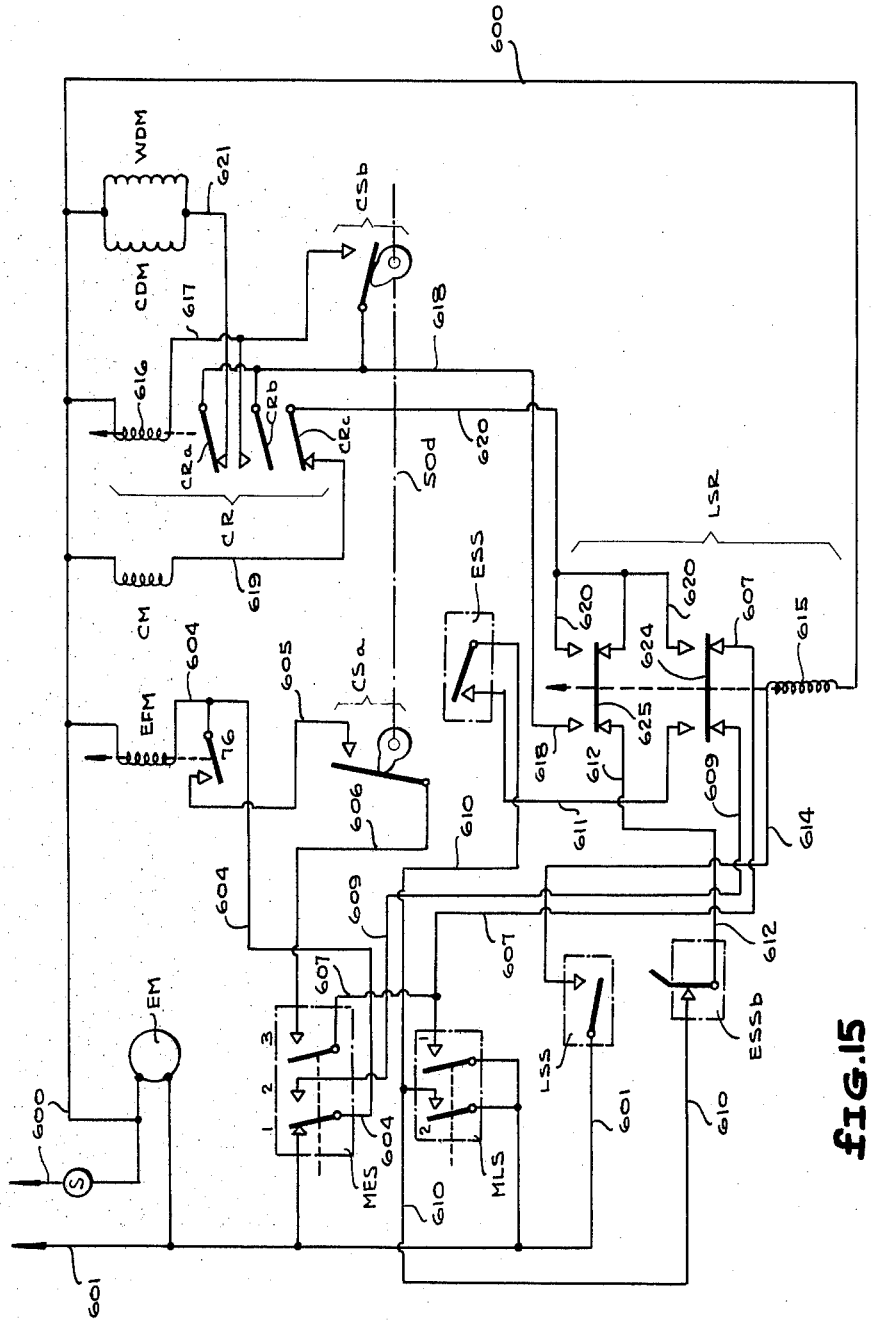

May 24, 1966 K. R. SCHNEIDER 3,252,849
LABEL APPLYING MACHINE

Filed Jan. 5, 1961 11 Sheets-Sheet 11

INVENTOR.
KURT R. SCHNEIDER
BY

Mason, Porter, Diller & Stewart
ATTORNEYS

United States Patent Office 3,252,849
Patented May 24, 1966

---

3,252,849
LABEL APPLYING MACHINE
Kurt Rudolf Schneider, Bainbridge, N.Y., assignor, by mesne assignments, to Eureka Specialty Printing Co., Scranton, Pa., a corporation of Delaware
Filed Jan. 5, 1961, Ser. No. 80,778
21 Claims. (Cl. 156—363)

This invention relates to improvements in label applying machines, by which a label is fed and applied to an article.

In my Patent 2,754,022, such a machine is shown, and the present devices as particularly valuable when employed therewith. In copending application, Serial No. 613,097, filed October 1, 1956, now U.S. Patent 3,010,864 in which I am joint applicant, such a machine is shown whereby one or more labels of a series may be marked and machine devices employed to detect the marked labels and prevent application to articles: the instant devices can be employed in such a machine assembly to remove and discharge the marked labels from the machine.

In the illustrative machine, the article is advanced with an essentially constant speed, and the label is applied thereto during the course of its travel. It has been found that the operation of the machine can be improved by employing rollers in opposed sets, including rollers on the device, e.g., a punch, which delivers the label to the article. The effect of a roller on the delivery device is to reduce frictional effects upon the label which could detain it against moving at the speed of the article, while pressing the label against the article so that the moisture therebetween, intended to render the gummed surface of the label adhesive, is spread out and caused to effect a uniform softening of the gum and its adhesion to the article. The interaction of the water and gum proceeds by a time function, so that the moisture upon the selected area of the article is not instantly ready to effect adhesion, and thus the continued pressure of the rollers acts to press the label and article more closely together as the gum softens and flows under the pressure effect for bonding onto the fibrous surface of an envelope, for example. Therewith, the label applying device is actuated during an applying cycle so that there can be a longer dwell while the rollers thereon are pressing the label against the article, noting that this can be essentially free of frictional resistance to label movement.

One of the objects of the instant invention is to provide such a label applying machine, in which the article is held and advanced at a continuous regular rate by rolls engaging its upper and lower surfaces, and in which the delivery of the label is accomplished by a member having label engaging rolls as a part thereof for relieving frictional resistance against the downward movement of the label at the same speed as the article.

Another object is the employment of means for feeding a strip of labels so that they successively are presented for delivery to articles, severing means for detaching labels successively from the strip and delivering the same against the articles, and rollers on the severing means for permitting an article with a label applied thereto to advance with low frictional resistance while the severing means acts to hold the label against the article.

A further object is the provision of such a machine with article advancing means, label feeding means and label applying means, the article advancing the label applying means including rolls for engaging and pressing the label and article together at the label applying point whereby moisture between the article and label is distributed over the gummed surface of the label while the label and article are moving forward at the same time.

A further object is the provision of such a machine with article advancing means and label applying means each including rolls aligned for contact during an applying cycle in the absence of articles and labels, certain of said rolls being driven, and including selector means responsive to the presence of markings on the labels whereby a marked label is moved by said label applying means while the advancement of an article to the applying point is prevented, and whereby said rolls are effective to remove the marked label from the applying point.

A further object is the provision of such a machine with article advancing means, a label strip feeding means, and means for severing and applying a label from said strip upon an article, said strip feeding means including a surface over which the strip is moved, a label guide plate overlying said surface, label detecting means on said plate, and devices for adjusting the positions of said plate relative to said severing means.

A further object is the provision of such a machine with means for feeding a label sheet which include a support having reciprocable feed devices for advancing the sheet by successive label areas to a detaching and applying device, a label plate for guiding the sheet along the support, a manual feeding roller for starting the sheet between the plate and support, the label plate being comformed for receiving the sheet from the roller and for exerting a detaining effect upon the sheet during return strokes of the feed devices and for assuring engagement of the feed devices with the sheet preparatory to the forward strokes.

An illustrative embodiment of the invention is shown on the accompanying drawings, in which:

FIGURE 1 is a top plan view;
FIGURE 2 is a side elevation;
FIGURE 3 is an elevation of the delivery end, with certain delivery parts removed for clearness;
FIGURES 4 and 4A together show an upright section, substantially on line 4—4, 4A—4A, of FIGURE 1 at a larger scale and with parts omitted for greater clearness, and with the stage in sections, the punch being shown in its lowermost position and pressing a label against an article;
FIGURE 4B is a fragmentary upright section on line 4B—4B of FIGURE 6, showing a train of gears with parts of shafts, with other parts omitted for clearness;
FIGURES 5 and 5A together show a horizontal section, substantially on line 5—5, 5A—5A, of FIGURE 4;
FIGURE 6 is an upright section, substantially on line 6—6 of FIGURE 1, at a larger scale;
FIGURE 7 is a top plan view of the label plate;
FIGURE 8 is an upright sectional view, substantially on line 8—8 of FIGURE 6, showing parts of the top plate and the overlying label plate, separated from one another for clearness;
FIGURE 9 is an exploded view of punch housing and punch parts;
FIGURE 10 is a view corresponding to a part of FIGURE 4, with the punch in uppermost position;
FIGURE 10A is a bottom view of the punch and die plates, separated from other parts;
FIGURE 10B is a corresponding bottom view of the punch housing assembly, with the punch therein;
FIGURE 11 is an upright section substantially on line 11—11 of FIGURE 1;
FIGURE 12 is a perspective view of a label plate piece with associated shaft and feed roller, the parts being separated;
FIGURE 13 is a perspective view of part of a shuttle bar, with part of a label strip thereon;
FIGURE 14 is a perspective view of the illustrative die plates;
FIGURE 15 is a circuit diagram;

Figure 1:
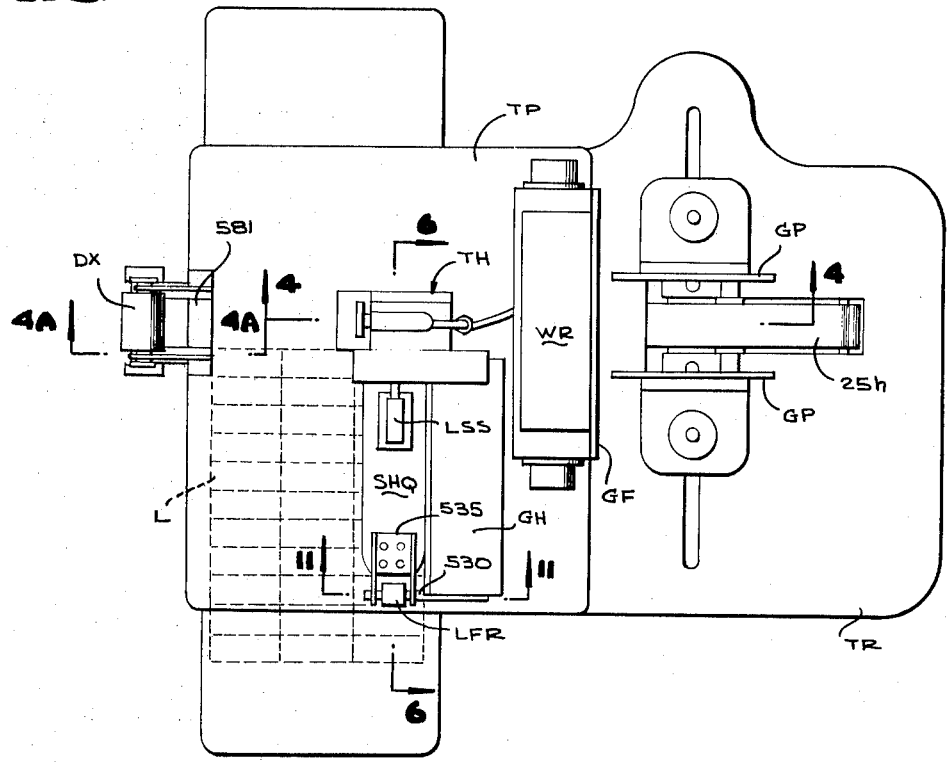
Figure 2:
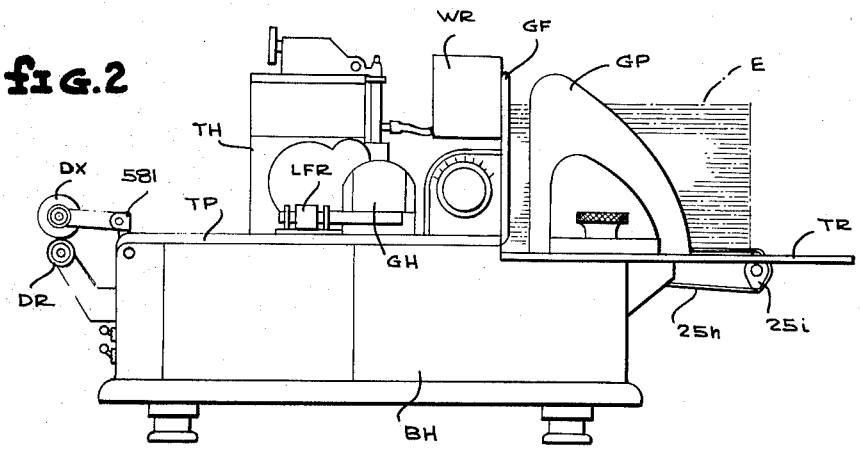

In FIGURES 1, 2 and 3, a label applying machine is shown with parts corresponding to those in my patent 2,754,022, and like reference characters will be empoyed, it being understood that some parts are differently shaped as set out below. A base housing BH has a top plate TP over which a label strip L may be fed; a table TR with upstanding guide plates GP upon and between which a stack E of articles such as envelopes or postcards may be placed and a guide plate GF against which edges of the upper articles of the stack are held while a lower article is being fed forward in the machine, a punch housing TH, and a label top plate SHQ with a label switch LSS thereon. The upright face of the base housing BH is conventionally shown with tumbler switch levers (FIGURES 3 and 6) marked "Label" for controlling a label switch MLS, "Motor" for the switch S, and "Envelope" for the switch MES, as set out hereinafter. The base housing BH contains a driving motor EM, FIGURES 5 and 15, connected through gearing 20, 21, 22 to a shaft AC having a bevel gear 23 in mesh with a bevel gear 24 on a primary feed roll shaft 25 so that the gears 30, 31, 32, 33, 43 are driven and therewith the shaft 37 which has universal joints 36, 38 at its ends. A stage S has a top 112 and is pressed upward by stage springs SS along guides 114. As an article is advanced by the feed rollers EFR to a position between the stage S and the lower surface of the top plate TP, the stage can yield downward at one of springs SS by a distance dependent upon the thickness of the article. Stage rollers SR are fixed (FIGURE 6) on the ends of transverse shafts 125 which are journaled in the body of the stage S; the first shaft 125a for the rollers SR which first receive the article from the feed rollers EFR, is mounted above the stage spring SS at the receiving end of the stage S, and is connected to be driven by the shaft 37. Each shaft 125 has a gear 126 and idlers 128 are journaled on the stage body to provide a train of gears 126, 128 so that all shafts 125 and the rollers thereon are driven in the same direction. The rollers SR project, FIGURES 4 and 6, above the level of the stage top 112, and engage the lower surface of the article, for advancing it along the stage.

Figure 16:
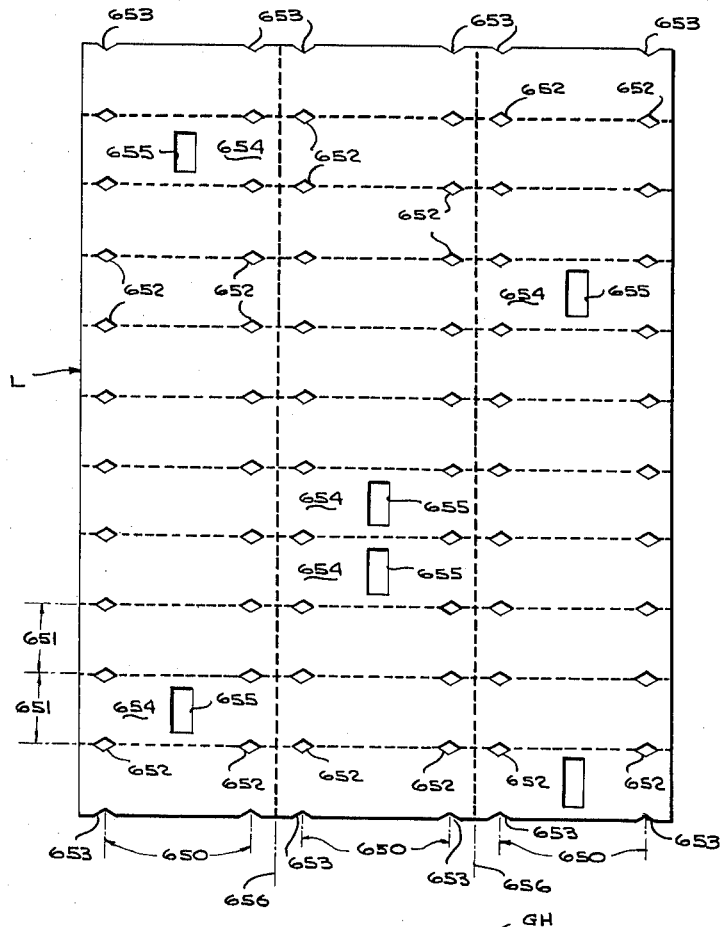
FIGURE 16 is an illustrative sheet of labels.

The constantly-driven shaft AC has (FIGURE 5A) a clutch member 46 fixed thereto, for cooperative engagement with the intermittently driven clutch member 46a formed as a sleeve within which the shaft AC can rotate when the clutch members are disengaged, and moved to engagement when the clutch solenoid CM is energized, and then effective in producing cycles of movement of a helical gear 50a, FIGURES 5A and 6, and thus of the meshing helical gear 50b which has a crank pin 161 for moving the pitman link 160 and thus reciprocating the shuttle bars LFB for feeding the label strips forward by one label distance for each cycle of movement and single rotation of the clutch member 46a. The gear 50a is also shown in mesh with a gear 50c (FIGURE 5A) on a shaft 50d which has cams 50e for actuating the cam switches CSa, CSb in the phase relation of a cycle as set out below in connection with FIGURE 15. A structure for producing such single cycles of movement upon energization of the solenoid CM is shown in my Patent 2,915,160. The shuttle bars LFB are located in grooves of inserted lubricant-containing pieces 165 at the top of the table plate TP (FIGURE 8) being spaced at a distance represented by the pairs of lines 650 in FIGURE 16; and have the major portions of their top surfaces flush therewith, with projections 155 (FIGURES 8 and 13) extending above the top of plate TP at spacings equal to the corresponding label dimension between lines 651 of FIGURE 16 for engaging in perforations of the label strip and thereby feeding the labels. The shoulders of the shuttle bars LFB are rabbetted along the lengths, so that bearing pieces 165 can extend over them for holding them in place; these pieces 165 being held to the top plate TP by screws 166. The projections or lugs 155 (FIGURES 6, 8 and 13) have their faces which engage the edges of diamond-shaped perforations 652 (FIGURES 13 and 16) or of the notches 653 at the ends of a label sheet L, formed to correspond with such edges but together being narrower than the perforations so as to cause lateral corrective shifting of the label sheet. In FIGURE 13, only one projection 155 is shown, for clearness. The rear part of each projection is sloped (FIGURES 6 and 13) so that the projections lift the label sheet during the return stroke of the shuttle bars and thus pass back for engagement in the next succeeding perforations.

The shaft 25 is in part surrounded (FIGURE 5) by a hollow shaft 25a upon which are fixed the feed rollers EFR with peripheral axially extending ribs: the shafts 25, 25a are connected by an overrunning clutch 25b. The normal peripheral speed of the feed rollers EFR when driven by shaft 25 is less than that of the stage rollers SR, so that when engaged by the rollers SR, the article is advanced more rapidly, and the overrunning clutch 25b can yield to permit the shaft section 25a to overrun the shaft 25. Gears 25c, 25d, 25e drive an article feeding roll 25f when the clutch elements 25g are engaged. Roll 25f receives the end of a belt 25h which at its other end is carried by a wobble pulley 25i (FIGURE 2) on a shaft mounted beneath the table plate TR. A second article feed roll 25j is driven from roll 25f by gears 25k. Such an article advancing assembly is described in detail in Patent 2,907,576, to which reference is made for the means of operating the clutch 25g and the function of the parts.

The gear 43 meshes (FIG. 4B) with a gear 34 on the shaft 58 of a thereby-driven feed roll 60, with the axis of shaft 58 located in the upright plane through the axis of the transverse shaft 125a for the first stage rollers SR, FIGURE 4.

A rock shaft 95 has the article-controlling feed fingers EFF fixed thereon, and a crank arm 98 which can be drawn down by solenoid EFM to raise the fingers and thus prevent article advancement. Separator members ERF of the adjustable type shown in Patent 2,907,567 are mounted above the feed rolls EFR to hold back all but the bottom-most article of the stack positioned on plate TR and belt 25h. Two sets, one above each feed roll EFR and having independent adjustments 156 as in said Patent 2,907,567, may be provided.

Figure 17:
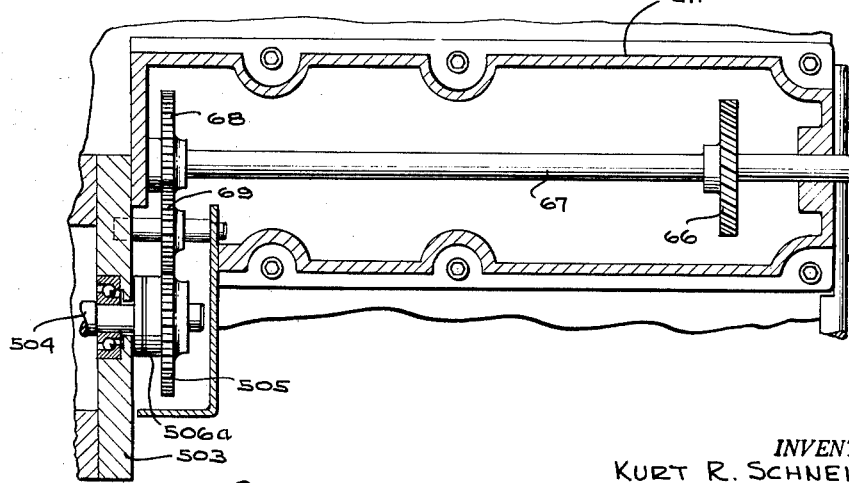
FIGURE 17 is a fragmentary horizontal section substantially on line 17—17 of FIGURE 6, to show punch drive parts.

A moistening device is provided as a brush 109 (FIGURE 4) mounted in a holder MH which is vertically reciprocated by a lever 74 (FIGURE 9) actuated by the cam 506a (FIGURES 6 and 17) during a cycle. A water reservoir WR (FIGURES 1, 2 and 4) is connected by a hose WRH to a valve WV which is actuated by a solenoid WDM with a stroke adjustment control 216. The lever 74 engages the pin 74a (FIGURE 4) on the member 74b for the brush holder MH, and lowers the brush 109 into contact with the article at a definite time and for a definite duration during a label applying cycle, and a controlled amount of make-up water is delivered to the brush under control of solenoid WDM A first normally open envelope sensing switch ESS (FIGURE 5) can be adjusted to a selected position along a rail 135 which extends parallel to the direction of article advancement and in its adjusted position acts to determine the position of label application relative to the leading edge of the article; and has an actuator arm 136 by which the switch is moved from normally open to closed position when encountered by the leading edge of the article. A second, fixed, normally closed switch (FIGURE 5) is located with its actuator 136a likewise in the path of the article, and being so actuated thereby that the switch ESSb remains open so long as an article is beneath the punch. These parts can be connected in circuit in the manner described hereinafter.

According to the present invention, the stage top 112 (FIGURES 5 and 6) has apertures through which project pairs of central stage rollers SCR which are fixed on the respective shafts 125 to turn with the lateral rollers SR, and being of the same diameter and having the same peripheral speed. The punch housing TH (FIGURES 6, 10B) supports two rollers 500, each aligned with an underlying lateral roller SR at the region where the label is to be applied to the passing article. Stage rollers SR and SRC which are located downstreamward of the punch are in cooperation (FIGURES 4, 4A) with respective top rollers AR journaled in the top plate TP.

The punch housing TH (FIGURES 4, 6, 9, 10 and 10B) comprises a body portion 501 having bottom pockets for the rollers 500 and supporting the shafts 502 thereof: and an upright closure 503 secured to enclose an upright cavity in the body portion. A punch drive shaft 504 is journaled in the body portion and a closure, extending through the latter and having fixed thereon a gear 505 and a moistening device cam 506a. The gear 505 (FIGURES 6, 17) is driven from the intermittently moving member 46a, as by a gear 66 in mesh with gear 50b and fixed on a shaft 67 journaled in a top housing GH, this shaft having a gear 68 fixed thereon and acting through an idler 69 in mesh with gear 505. Within the housing, the shaft 504 has an eccentrically fixed circular cam 506 which engages the horizontal rails 507, 508 fixed on a punch 509: these rails preferably being of lubricant-containing porous metal. The punch is positively driven downward for severing and applying the labels, and is under control by the engagement of cam 506 with the rails 507, 508 through its movement which comprises relative "dwells" at the top and bottom of its strokes, with rapid ascent and descent. The punch 509 is hollowed, for the movement of the cam and for the shaft 504, and has a cutting knife 510 at its bottom. Rollers 511 are journaled at the bottom of the punch with their axes in respective upright planes aligned with shafts 125, so that these rollers 511 cooperate with corresponding driven central rollers SCR. The punch 509 is guided by rails 515, the housing body and closure for vertical movement by the action of cam 506 on the rails 507, 508: and is urged upwardly by springs 512 (FIGURES 4 and 10) which are located by cavities 513 in the body portion and engage the lower surfaces of horizontally projecting ears 514 on the punch.

The punch has a cutting edge 510 extending parallel to the lines 651 of the label sheet L (FIGURE 16) so that by cooperation with a die plate 81 (FIGURES 6, 10A and 14) recessed in the top plate TP, it can cut along such a line extending across the pair of diamond-shaped perforations 625 which lie between the area of the label located in the punch housing and the area of the next succeeding label which overlies the die plate 81. The edge 510 can be interrupted by notches 509a for receiving the ends of the shuttle bars, as set out hereinafter. The punch also has a cutting edge 517 (FIGURE 10A) for cooperation with a die plate 81a (FIGURES 4 and 14) likewise recessed in the top plate TP. Preferably the upper surfaces of the top plate and die plates are flush with one another. The housing TH has a horizontal slot 518 just above these top surfaces (FIGURES 10 and 9) and extending from the left hand end of the punch housing TH (FIGURE 4) to a point beyond the punch, so that the unused columns of a label sheet L may move forward freely as the first column provides a label strip which is being continually sensed by the label switch, fed beneath the punch, and severed thereby. The cutting edge 510 of the punch is preferably at a slight angle, around 5 degrees, to the horizontal, so that the edge 517 first cuts a label area from the label sheet at a column line 656 (FIGURE 16) and thereafter the cutting edge 510 completes the severance by proceeding from the line 656 toward the right in FIGURE 4, i.e., toward the left in FIGURE 16.

The punch housing member 501 can be formed integrally as a strong unit with the foot portions 501a which support the die plates 81, 81a (FIGURES 4, 9, 10, 10B): and thus the housing and punch can be set up and adjusted before attachment to other parts.

As shown in FIGURES 1, 6, 11 and 12, a stub shaft 530 extends above the top plate TP near and parallel to the edge at which the label strip L is introduced. A manually operable preliminary label feeding roller LFR has a rubber jacket and a central opening larger than the shaft 530 so it may move up and down relative to the shaft axis. The label plate SHQ (FIGURES 7, 8, 11 and 12) has a body 531, e.g., of bakelite, extending above and in contact with the upper surface of the label sheet L as the latter is being fed, this body having grooves 532 in its lower surface for the passage of the feeding projections 155 on the shuttle bars LFB. Metal reinforcing bars 533 are mounted on top of the body 531, above the respective grooves 532. Notches in the bars are aligned with upwardly divergent conical holes in the body 531, to loosely receive balls 534 so that the latter can move up and down but are detained against leaving the body: in their lowermost position, they can be encountered and raised by the projections 155 in the absence of a label sheet. A preferred position for the balls on the label plate SHQ is that in which they lie slightly in front of the positions of corresponding projections 155 when the shuttle bars LFB have been fully withdrawn to the right. In such position, the balls act to press the label strip downward in front of the projections 155 so that these projections have assured engagement into the perforations 652 (FIGURE 16) preliminary to the next forward, label-feeding stroke, even when the label strip has a curl therein or is embossed due to heavy pressure in printing the address thereon. A locating piece 535 (FIGURE 12) is secured to the top of the body 531; and has side pieces 536 which have notches 537 at their bottoms to fit loosely around reduced portions 538 of the stub shaft 530 at the ends of the manual feed roller LFR and thus hold the latter and the label plate in proper axial position on the shaft. The piece 535 has holes 539 for receiving smaller securing screws 540a (FIG. 7) so that the plate body 531 may be adjusted toward and from the axis of shaft 530 and its grooves 532 aligned with the shuttle bars LFB.

The label plate body 531 has rounded corners (FIGURE 1) at the end where the label sheet enters: and its bottom surface is inclined downward from this end for about a third of its total length, and past the illustrated balls 534, to afford easy entry for the edge of the label sheet, and for its remaining length can lie flat on the table TP or the label sheet thereon, to provide friction. The body 531 extends beneath the closure 503 of the punch housing, and has its edge 540 above the die plates 81, 81a (FIGS. 9 and 14) which are recessed into the top plate TP (FIGURE 6), this edge being beveled upward and away from the punch at an angle of about 88 degrees to the horizontal so that if the body 531 is adjusted too far into the punch housing, the punch will force the body 531 outward rather than cutting into it. Such outward movement is permitted by the loose mounting of the side pieces 536 on the stub shaft 530. Adjacent this edge of the body 531, it has an aperture 541 above the position of a label held ready to be advanced beneath the punch during the next cycle. The label sensing switch LSS is secured on top of the body 531 and has a projecting actuator arm 182 with an end which can be moved up and down in the aperture 541 and in the notch 81c provided in the die plate 81, and thereby produce label-sensing operation of the label switch LSS. With the assembly, when one label of a label strip is accurately located beneath the punch, the next label overlies the die plate 81 so that it is being sensed by the arm 182 of the switch LSS.

In the illustrated form, the shuttle bars LFB are recessed at the bottoms of their ends which pass beneath the housing closure 503 for clearing the die plate which has grooves 81b (FIGURE 9) for the passage of these bars, and lugs 155 are provided at their ends for pushing the last label of a label strip accurately into place beneath the punch. The grooves 81b are aligned with the lugs 155 and thus with the perforations 652 where severance by the edge 510 is not needed. Correspondingly, the cutting edge 510 is shown (FIGURE 9) as having like notches 509a for the shuttle bars.

After the label has been applied to the moving article by the punch 509, the punch dwells momentarily in its bottom position by the action of the eccentric circular cam 506; noting that the punch has pressed the label against the article so that the latter has depressed the stage rollers and stage against the action of the stage springs SS and the upward return movement of the stage and its rollers continues a pressure between the article and label until the punch rollers 511 have risen above the lower surface of the top plate TP. During this "dwell" time, the article has continued to move by the action of the stage rollers SR, SCR, and the label travels at the same speed and essentially without retarding friction as the punch rollers 511 turn. Thus the article and label thereon may travel a half inch during such dwell. This pressure between the punch rollers 511 and the stage rollers SCR causes the moisture on the article, which was applied by the brush 109, to be spread and to effect softening of the label gum to tacky condition with firm adhesion to the surface of the article. This pressure of the label upon the article, with relief of friction against the bottom of the top plate TP, is continued by the rollers AR (FIGURE 4A). The article passes from beneath the top plate TP at the opening AP (FIGURES 3, 4A), and thence over a delivery roller DR and can be deposited on a platform DP. The roller DR is driven at an increased peripheral speed over that of the stage rollers SR by a belt DB. A top roller DX of absorbent sponge may be mounted above the roller DR for absorbing excess moisture from the article area surrounding the applied label, and acts to deflect the leading edge of the article downward for delivery to the platform DP. Such delivery structures are described and claimed in the copending application, Serial No. 6,819, filed February 4, 1960, now U.S. Patent 3,046,010, to which reference is made for details of a specific embodiment.

When an "improper" label, such as a label area 654 (FIGURE 16) and identified by the hole 655 therein, comes to the arm 182 of the label sensing switch LSS, a further label advancement cycle is accomplished, this "improper" label is advanced to position beneath the punch 509, the punch descends and severs the label from the strip and moves it downward into engagement with the stage rollers SCR beneath the punch aperture in the top plate, pressing it for a "dwell" time against these rollers SCR by the action of the punch rollers 511. This cycle has been accomplished without the delivery of an envelope, and after the preceding envelope has cleared the punch aperture as described hereinafter. There is no moisture present, because no envelope has passed the wetting brush. The advancing action of the stage rollers SCR causes the severed "improper" label to move toward the left in FIGURE 4, with the label relieved from the top friction by the punch rollers 511, and to continue beneath the top plate TP until it also passes through the opening P (FIGURE 3) and between the rollers DR, DX which continue its advancing movement.

According to this invention, the "improper" labels and the labeled articles are separated after passing the rollers DX, DR. For this purpose, a deflector device is provided, comprising a resilient metal blade 580 which is held on top of the plate TP by the support 581 for the roller DX and extends along the path of the articles and rejected labels. Depending from the blade 580 are flexible flags 582, e.g., pieces of cloth, which are easily flexed upward by the stiffer and heavier articles and thus exert little retarding action thereon, but which oppose a relatively greater effect to the more flexible and lighter weight labels, so that a rejected label LX is deflected downwardly as indicated by the arrow 583 and passes downward along a shield 584 without entering the stack of labeled articles being formed on the platform DP, while the labeled articles LA pass over the upper end of the shield 584, and are collected on the platform DP as a stack ED, being aligned by guide walls such as DPX on the platform.

For the operation of the mechanical parts, with normal running, a stack E of articles is placed on the rear table TR and upon the wobble belt 25h. In the absence of a label on the die plate 81 and detected by the label sensing switch LSS, the fingers EFF are in raised position, and stop the advancement of the articles. With the motor EM running, the rollers EFR are rotating, ready to feed an article when the fingers EFF drop. If there is no label strip in the machine, the clutch 46, 46a causes successive forward and return strokes of the shuttle bars LFB with their lugs 155.

A label sheet L can now be inserted beneath the manual roller LFR which is raised by the thickness of the sheet but acts gravitationally to prevent the sheet from falling out. The roller LFR is then moved manually while the sheet L is being roughly adjusted to position beneath the label plate SHQ which has its lower surface beveled upward by the greater than the label sheet thickness for easy entry of the sheet, so the sheet perforations 652 are approximately aligned with the lugs 155 of the shuttle bars and moved forward until the first pair of lugs on the bars engage in the pair of perforations 652 behind the first label area. The next forward stroke of the shuttle bars causes the lugs 155 to move the sheet forward by one label distance, and cause the sheet to make a lateral movement, if needed, toward a position of accurate alignment. During the return stroke, the inclined surfaces of the lugs 155 lift the overlying sheet portions into the grooves 532 of the label plate, and the label plate exerts a detaining friction upon the sheet L. Near the end of the return stroke, the lugs 155 come beneath the next pair of sheet perforations 652 and, during the succeeding forward stroke, act thereon to produce a forward movement of the sheet by another label distance. This action continues until the first "proper" label overlies the die plate 81 and is detected by the label sensing switch LSS. Thus, after the shuttle feeding of the sheet begins, the manual roller LFR has completed its duty and can be released: thereafter, it turns freely as the sheet moves beneath it. During the advancement, the lugs 155 combine to exert a laterally corrective action upon the sheet L to assure and maintain its alignment. The shuttle lugs 155 during return strokes lift the balls 534 and then permit the balls by their weight to press the label sheet downward in front of the lugs 155 so that the lugs engage in the sheet perforations 652 during the succeeding forward or feeding stroke. When the sheet has advanced along the beveled part of the bottom of the label plate SHQ, it is being engaged at several pairs of the perforations 652 by several pairs of the shuttle lugs 155, and the distributed pressures cause the sheet to lift the label plate SHQ and continue the sheet movement without tearing at the perforations.

When a "proper" label arrives over the die plate 81, the label sensing switch LSS acts through the circuit arrangement described below to stop the continued forward label feeding, and to cause the fingers EFF to release an article which is then moved forward beneath the top plate TP by the wobble belt 25h and the rear table rollers, being then engaged by the feed rollers EFR and delivered between the top roller 60 and the first stage rollers SR. The stage S can move downward, at its right hand end (FIGURE 4), to receive the leading edge of the article which is then accelerated in speed, and passed along the stage by the rollers SR, SCR thereon, and the rollers 500, AR beneath the top plate with appropriate stage yielding dependent on the thickness of the article. During the course of this travel, the leading edge of the article encounters the actuator 136 of the first article switch ESS and closes the same, and thereby starts a cycle of the intermittently moved parts, by which the wetting brush is lowered to wet a predetermined region of the article, and the label area is advanced to position beneath the punch 509, this punch descends and severs the label and delivers it against the wetter region of the article with downward pressure by the punch rollers 511 which compressed the label upon the article against the resistance by the underlying central stage rollers SCR which are being urged upward by the stage springs SS. This pressure continues, with the stage being depressed, while the shape of cam 506 causes a dwell to occur. Therewith, the forward movement of the article, by the action of the stage rollers SCR, SR, causes the label to move with it, the punch rollers 511 offering essentially no resistance to the label movement but continuing to press the label against the article while the water is spread and the gum is becoming tacky. As the punch 509 moves upward again, the stage S likewise returns by the action of its springs SS thereby continuing the dwell effect. The label and article pass beneath the top plate until the labeled article is ejected from the machine with passage beneath the absorbent top roller DX which removes excess moisture from around the article region now covered by an adherent label; and thus into the stack ED. So long as the article engages the actuator of the second article switch ESS$b$, no new cycle can be started, nor an advancement and delivery of an improper label, as set out below.

If the switch LSS detects an "improper" label, then by the circuits set out hereinafter, an article advancement is prevented but a further intermittent cycle is initiated so that the "improper" label is advanced beneath the punch 509, the punch severs this label and moves it downward through the top plate TP onto the rotating stage rollers SCR, with a downward movement of the stage, and the rollers SCR now move the label, during the punch dwell and with low frictional resistance of the punch rollers 511, toward the left in FIGURE 4 so that it comes beneath the top rollers AR and continues toward the left until it is engaged by rollers DR, DX, and deflected by the flags 582.

A single wide strip of labels can be fed from a roll, in like manner: and any label area having a marking of "improper" will likewise be severed and ejected without article feeding.

This succession of effects is attained by a supervising and control system including circuits as shown in FIGURE 15.

In the circuit diagram of FIGURE 15, the parts are supplied from the main conductors 600, 601, with a main switch S in conductor 600. The motor EM is connected across conductors 600, 601 and starts when the switch S is closed. The switches CS$a$ and CS$b$ are conventionally shown as operated by cams associated with the intermittently driven member 50$d$ (FIGURE 5A) so that switch CS$a$ is momentarily opened near the end of each cycle and remains open until shortly after the start of the next cycle, and switch CS$b$ is momentarily closed shortly after the start of each cycle. The manual envelope switch MES has two poles, both serving to close circuits at contacts 2, 3 when the switch MES is in the right hand position, but with one closing at contact 1 when the switch is in left hand position: when switch MES is in the right hand position, envelopes are fed under the controlled conditions described below, but when it is in the left hand position, no envelopes are fed. The manual label switch MLS has two poles, for closing circuits at contacts 1, 2 when in the right hand position, but closing no circuits when in the left hand position. The solenoid EFM controls the feed fingers, and prevents an envelope feeding when energized, and also closes a switch 76 when the solenoid is energized. The solenoid CM controls the clutch for the intermittently moved parts including the conventionalized shaft 50$d$ having cams for the switches CS$a$, CS$b$; and is effective to procure closure of the switches and start of a cycle when the solenoid CM is energized. The control relay CR has an actuating solenoid 616 and three switch blades CR$a$, CR$b$, CR$c$, with blades CR$a$ and CR$c$ closing circuits and blade CR$b$ opening a circuit, when the solenoid 616 is energized. Solenoid WDM determines the delivery of water to the wetting device, and is so included in the circuit that water is supplied only when a proper label is to be applied to an article in a respective cycle. Solenoid CDM is connected in parallel to solenoid WDM and actuates a counting device which thereby serves to indicate the number of labelled articles which have been delivered, without including the number of cycles employed for advancing the label sheet without envelope delivery, e.g., by reason of advancing a fresh label sheet to engagement with the label sensing switch LSS or by reason of the detection and discarding of an "improper" label. The label relay LSR has illustratively two bridges 624, 625 which are in lower position when the solenoid 615 is de-energized by open position of the label sensing switch LSS, and are raised upon energization of the solenoid 615.

The feed finger solenoid EFM is connected at one terminal to conductor 600, and at the other terminal conductor 604 leads to the manual envelope switch MES, and thence by contact 1 when the switch MES is in the left hand position to conductor 601, so that current flows through the solenoid EFM and the feed fingers EFF are lifted. A branch of conductor 604 leads to the switch 76 which is closed when the solenoid EFM is energized, thence by conductor 605 to a contact of cam switch CS$a$, thence by conductor 606 to contacts in the manual switch MES which is closed when this switch MES is in the right hand position; and thence by conductor 607 to contact 1 in the manual label switch MLS, and thence to conductor 601. The conductor 604 is also connected at the manual envelope switch MES, when the switch MES is in right hand position, to contact 2 and thence by conductor 609 to a contact of relay LSR which is closed when this relay is de-energized and its bridge 624 is in lower position, and thus to conductor 607 and by the manual label switch MLS to the conductor 601.

The clutch solenoid CM is connected between the conductor 600 and a conductor 619 which extends to a contact of the control relay CR which is closed when this relay is de-energized and its blade CR$c$ in lower position. From this relay, the circuit continues by a conductor 620 to a contact of the relay LSR which is closed by the bridge 625 when the relay LSR is de-energized, thence by conductor 612 to the second envelope sensing switch ESS$b$, thence by a conductor 610 to contact 2 of the manual envelope switch MLS, and thence to the conductor 601. A branch of this circuit extends from the conductor 620 to a contact of the relay LSR which is closed by its bridge 624 when the relay LRS is energized, thence by conductor 611 to the first envelope sensing switch ESS and to conductor 610 when the switch ESS is closed, and thence by the label switch MLS to the conductor 601 when switch MLS is closed.

The control relay CR has a solenoid 616 connected between the conductor 600 and a conductor 617. On the one hand, conductor 617 extends to the cam switch CS$b$ so that when this cam switch is closed, a circuit is established by a conductor 618 to a contact of the relay LSR which is closed by bridge 625 when this relay is energized, and thus to the conductor 620. On the other hand, the conductor 617 is connected to a contact of relay CR which is closed by relay blade CR$b$ when the relay CR is energized, and thence to conductor 618, so that the connection between conductors 617 and 618 can be maintained when the cam switch CS*b* later reopens.

The water control solenoid WDM and the solenoid CDM of a counting device are connected in parallel between the conductor 600 and a conductor 621 which extends to a contact of the control relay CR which is opened by its blade CR*a* when the relay CR is energized, and with the relay de-energized extends to conductor 618 and by bridge 625 of relay LSR to conductor 620 so that the action of solenoids WDM and CDM are controlled by relays CR and LSR as well as by the manual label switch MLS and by the envelope sensing switch ESS.

In operation, for normal running, with short envelopes ready for use, an initial position is that with the clutch solenoid CM de-energized and the intermittent shaft 50*d* at a standstill at the end of a cycle; the cam switches CS*a* and CS*b* are open. The label relay LSR is in de-energized or lower position. The first envelope switch ESS is open: the second envelope switch ESS*b* is closed. Switches MLS and MES are in right hand position, with contact MES–1 open, and the other contacts closed.

When the main switch S is closed, the motor EM starts, and runs so long as switch S is closed. In the absence of a label sheet, the label sensing switch LSS is open, and the solenoid 615 of the relay LSR is de-energized, and the lower relay contacts are closed by the bridges 624, 625. It will be assumed that energization of the envelope feed solenoid EFM is occurring by the circuit 600-EFM-604-MES-609-624-607-MLS-601. A circuit is closed from the conductor 600 through the clutch solenoid CM by 600-CM-619-CR*c*-620-625-612-ESS*b*-610-MLS-601, so that the clutch is released and closed, the intermittent shaft 46*a* turns and cycles are performed. When a label sheet is introduced, the shuttle bars LFB engage it by the projections 155 and advance the sheet by one step or label distance for each cycle, until the sheet comes beneath the arm 182 for closing the label sensing switch LSS.

When the label sensing switch LSS detects a "proper" label, a circuit is closed 600-615-614-LSS-601. The coil 615 is energized and the bridges 624, 625 of relay LSR are lifted. The lower bridge 624 opens the above energizing circuit for the feed finger solenoid EFM between conductors 609 and 607. Since this occurs at the beginning of a clutch cycle, a maintaining circuit is provided by the path 600-EFM-604-76-605-CS*a*-606-MES-607-MLS (contact 1)-601 until the end of the cycle, thus preventing the immediate release of an article by de-energization of the solenoid EFM for the feed fingers EFF until the cam switch CS*a* opens this maintaining circuit. Thereupon, solenoid EFM is deenergized, the feed fingers EFF drop, and an article starts through the machine.

When this article encounters and closes the first sensing switch ESS, a circuit is established by 600-CM-619-CR*c*-620-bridge 624 of relay LSR-611-ESS-610-MLS-601. Solenoid CM is energized, and a cycle is started.

During running, with continual envelope feeding and delivery of proper labels, and with switches MES and MLS in the right hand positions, the solenoid EFM for the envelope feed fingers EFF remains deenergized; and hence switch 76 is open, the circuit 604-76-CS*a* is open and no control is exercised by the cam switch CS*a*: but if either contact 1 of the manual envelope switch MES is closed or the bridge 624 of relay LSR drops upon lack of a proper label at the label sensing switch LSS, an energizing circuit is established to the solenoid EFM so that switch 76 is closed, and thereupon the cam switch CS*a* becomes effective to de-energize solenoid EFM at a proper point of the cycle of the shaft 46*a*, as set out hereinafter.

Shortly after the start of the cycle, cam switch CS*b* is closed; and a circuit is established 600-616-617-CS*b*-618-625-620-624-611-ESS-610-MLS-601. Solenoid 616 is energized and the blades of relay CR are lifted. Blade CR*c* opens the circuit through solenoid CM, so that the clutch can open and the intermittent shaft 46*a* come to a standstill at the end of a single revolution or cycle. Blade CR*b* closes the circuit between 617 and 618 so solenoid 616 remains energized when cam switch CS*b* opens shortly after its momentary closing. Blade CR*a* opens the wetting circuit 600-WDM-612-CR*a*-618 to determine the make-up flow to the wetting brush, and prepares the solenoid CDM for a counting operation.

During this cycle, the label is advanced to position beneath the punch, the punch is moved down to sever and apply the label, and then moves up to its initial position. As the label strip moves, the label switch LSS responds to the next label. If this second label is also "proper" for application, the switch LSS remains closed and the relay LSR remains in raised position.

The envelope continues its regular advancement through the machine, and encounters and opens the second envelope switch ESS*b*; but without circuit effect so long as relay LSR is energized. Thereafter, the trailing edge of the envelope leaves the first envelope sensing switch ESS so this switch opens and therewith breaks the circuit 600 - 616 - 617 - CR*b* - 618 - 625 - 620 - 624 - 611 - ESS-610-MLS-601, and the solenoid 616 of the control relay CR is de-energized, so that its contact CR*a* restores connection, for the next cycle, for the water and counting solenoids WDM and CDM, its contact CR*b* further breaks the maintaining circuit for solenoid 616 noting that the circuit through solenoid 616 has already been broken at the first envelope switch ESS and its contact CR*c* tentatively closes a circuit through the clutch solenoid noting that this circuit is broken at the envelope switch ESS but ready for closure when a new envelope actuates this switch ESS. If the passing envelope is so long that its trailing edge has not released the first switch ESS before the cycle is completed, the circuit 600-616-617-CR*b*-618-625-620-624-611-ESS-610-MLS (contact 2)-601 remains closed, with relay CR energized and its blade CR*c* keeping the circuit branch 600-CM-619-CR*c*-620 open so that solenoid CM is not energized and another cycle cannot begin until switch ESS again opens as the article passes it, even though a "proper" label is ready at the label switch LSS. Comparably, if there is an "improper" label at switch LSS, so relay LSR has its bridges in lower position, the circuit which consisted of path 600-616-617-CR*b*-618-625-620 is broken at bridge 625 and solenoid 616 is de-energized so relay CR closes its blade CR*c* between conductors 619, 620. However, the circuit 600-CM-619-CR*c*-620-625-612-ESS*b*-600 is still open at ESS*b* until the article has passed switch ESS*b*.

If the label sensing switch LSS detects an "improper" label which has been advanced during a cycle, it opens; the solenoid 615 is de-energized, and relay LSR drops. A circuit is then established by 600-EFM-604-MES-609-624-607-MLS-601 which energizes solenoid EFM and prevents envelope feeding. When bridge 624 of relay LSR drops, the circuit 600-616-CR*b*-618-625-620-624-611-ESS-610-MLS-601 is opened at both 624 and 625 so 616 is de-energized, and the contact blades of relay CR move down, closing CR*c*. As soon as the preceding envelope has cleared the second envelope switch ESS*b*, this switch closes: meanwhile the envelope has passed from the region at which a label can be applied to it. Upon closure of the switch ESS*b*, a circuit is closed by 600-CM-619-CR*c*-620-625-612-ESS*b*-610-MLS-601, so the solenoid CM is energized, and a new cycle is started by which the label strip is advanced by one step, the punch severs the "improper" label and delivers it against the stage rollers 126 so that this improper label is immediately moved along after the preceding labeled envelope, and discharged from the machine; noting that envelope feeding has meanwhile been prevented by the above circuit through conductors 609, 607 and bridge 624 which energizes the solenoid EFM. When the switch ESS*b* closes, also, the circuit 600-616-617-CR*b*-618 is open at bridge 625 of the relay LSR, so solenoid 616 is without energy, and its contact blade CR*c* can close the circuit 600-CM-CR*c*-620-625-612-ESS*b*-610-MLS (contact 2)-601 for re-energizing solenoid CM and assuring a new cycle. If a succession of "improper" labels are detected, the cycles are repeated until a "proper" label comes to the switch LSS.

At times, it is desirable to run the machine with envelopes only, without applying labels thereto, e.g., in the course of adjusting the position of the envelope in the machine. For this, the manual label switch MLS is moved to the left, to open the circuit 600-EFM-604 regardless of the position of the relay LSR or the cam switch CSa. Switch MES is left in right hand position. The envelopes are fed forward in succession at a rate determined by the selector devices above feed roll ERF. This movement of switch MLS also opens all circuits and branches through the clutch magnet CM, the coil 616 of relay CR, and the water solenoid WDM at a point between conductors 610 and 601, regardless of the position of the cam switch CSb, relays LSR and CR, and of the switches ESS, ESSb: so that no label feeding occurs.

If it is desired to effect the label feeding in the absence of envelope feeding, the switch MES is moved to the left. The circuit by 600-EFM-604-MES (at contact 1)-601 is closed: the solenoid EFM is continuously energized, and no envelopes are fed. Assuming that there are no labels in the machine, and that a fresh sheet is introduced, the label switch LSS is open, the solenoid 616 de-energized, and the bridges 624, 625 of relay LSR are in lower position. Current then passes by the path 600-CM-619-CRc-620-625-612-ESSb-610-MLS (contact 2)-601 as soon as switch ESSb is closed, that is, at once if there is no article in the machine or as soon as a passing article has left switch ESSb. Energization of the solenoid CM causes the clutch to close and a succession of label feeding cycles occur, until the switch LSS is moved by a "proper" label. The solenoid 615 is then energized, the bridges 624, 625 of relay LRS are lifted, and the circuit through solenoid CM is broken between conductors 620, 612.

The switch MES can be moved at any time, to stop envelope movement. Thereafter, it can be closed at any time, between cycles or during a cycle. The cam switch CSa is closed for successions of cycles except for brief periods which begin at the close of one cycle and end after the start of the next cycle, so that the switch CSa is open if the intermittent drive stops at the end of a cycle. The switch CSa, being closed for the major part of the cycle, acts in conjunction with switch 76 which is closed when solenoid EFM is energized to prevent envelope feed, to maintain the energization of solenoid EFM until switch CSa determines the proper time in cycle for the next envelope to be fed. If the envelope switch MES is moved to the right hand position, to re-start envelope feeding, while a cycle is in progress, the closing of contact 3 of switch MES occurs before de-energization of the solenoid EFM has caused opening of the switch 76, and switch CSa now maintains energization of the solenoid EFM by the said path 600-EFM-604-76-MES (contact 3)-607-MLS (contact 1)-601 until the switch CSa opens at the end of the cycle. If the intermittent shaft 46a is at a standstill at the end of a cycle, the switch CSa is open, the solenoid EFM has been energized by contact 1 of switch MES; and when MES is moved to open its contact 1 and close its contact 3, the said maintaining circuit is now open at CSa so solenoid EFM is at once de-energized, an article starts, and the switch 76 is opened.

If it is desired to inspect the operation of the label feeding system without feeding of envelopes then in the machine, for example, to determine that the label shuttle bars deliver the labels to proper position for severance or to determine the sharpness of the punch and die plates, the switch MES can be moved to the left, and label sheet having all label areas marked as "improper" is fed to the machine. The individual labels are fed, cut, and discharged. If there are no envelopes in the machine, no movement of the switch MES is necessary for such inspection.

The circuitry establishes control of the water-supplying and counting devices, so these operate only when an article is being labeled. Thus, with postal addressing, the counter shows the number of items which are to be mailed. Comparably, there is no supplying of moisture when no envelope is being fed to the label applying point. At the start of operations, with the blades of relay CR in lower position, a tentative circuit is set up by the path 600-WDM and CDM in parallel-621-CRa-618-625-620-624-611-ESS-610-MLS-610 but this is open at 625, 624, ESS in the absence of labels and envelopes regardless of the position of relay CR. When a label sheet is supplied, the preliminary advancement occurs without moisture delivery or counting. The first "proper" label acts at switch LSS to energize relay LSR and close this tentative circuit at 624, 625; but it is still open at the envelope switch ESS. When an envelope closes switch ESS, the clutch solenoid CM is energized, as set out above, to start a label cycle, and also the current then flows through the said tentative circuit: the solenoid WDM opens the water supply valve, and solenoid CDM sets the counter device. The cycle of shaft 46a starts, and the relay CR is energized a short time after such starting, so that blade CRa again opens the circuit. Thus current supply to and energization of the solenoids WDM and CDM are coordinated in the cycle, as short pulses each time that both article and label are present for attachment to one another. When an "improper" label is detected by switch LSS, the said tentative circuit is broken at bridges 624, 625 of the relay LSR. When no envelope is passing, the circuit is broken at switch ESS. When a passing envelope clears the switch ESS, this switch opens and flow of current in conductor 620 ceases even though a "proper" label has been sensed. Therewith the maintaining circuit 600-616-617-CRb-618-625-620 is also opened, and relay CR assumes the lower position until the next article closes the switch ESS: hence, a water delivery and a counting occurs for this new article. When switch MSL is in the left hand position, this tentative circuit is open at its contact 2.

It is obvious that the invention can be practiced in other than the illustrative manner, within the scope of the appended claims.

What is claimed is:

1. In a machine of the class described, a support, means for advancing articles past an opening for label application and including a spring-urged stage having driven rollers thereon, means for feeding a strip of labels toward said opening, a punch housing on the support at said opening and into which the strip is fed, a punch in the housing and having a bar extending parallel to the direction of article advancement, an eccentric cam of circular outline mounted for rotation in the housing and in engagement with the bar whereby to move the punch toward the label strip, means for rotating the cam, spring means for moving the punch away from the label strip, the punch during movement toward the strip being actuated by the cam to sever and move the end label area of the strip into engagement with the article on said stage, and rollers mounted on and carried in movement with the punch and respectively aligned with driven rollers on the stage, said punch-mounted rollers being effective during the punch movement for engaging the said end label and pressing it against the article and therewith depressing the stage against its said springs, and active to facilitate the movement of the article and the label thereon along said stage.

2. In a machine of the class described, a plate, a stage mounted at one face of the plate and spring means for urging the stage toward the plate, said plate having an opening, a driven roller on the stage for advancing an article therealong, means for feeding labels along the opposite face of the plate and to said opening, a punch-mounted at said opposite face of the plate for reciprocation toward and through the opening, a roller carried by the punch and aligned for engaging the stage roller when the punch has passed through the plate and thereby causing the stage to move away from the plate, and means for reciprocating the punch whereby the same severs and moves a label from said opposite face of the plate until said punch roller presses the label against an article engaged by the stage roller.

3. In a machine of the class described, for employment with a strip of labels of which some are proper for application to articles and others are improper, a plate having an opening therein, means for advancing articles along one face of the plate and including a stage having driven rollers thereon, a first driven stage roller being opposite the opening and others of said stage rollers being positioned for engaging the article after it has passed the opening, spring means for urging the stage toward the support, rollers on the support aligned for cooperation with the said other stage rollers, means for successively feeding labels along the opposite face of the support and toward the opening, a punch mounted for reciprocation toward and through the opening and effective to apply proper labels to articles, and a roller on the punch for pressing a severed label upon an article against the counterpressure of the stage rollers and therewith move the stage against the action of its spring means and being effective to facilitate the advancement of the severed label with the article away from said opening, selecting means for detecting the presence of an improper label and means controlled thereby for preventing the advancement of an article to the opening when an improper label is to be moved therethrough by said punch, the punch roller and said one stage roller being effective for moving the improper label from said opening to the said other stage rollers whereby the latter eject the said improper label from the machine.

4. A machine as in claim 3, said machine having an outlet through which the labeled articles pass, and including means at the outlet of the machine for deflecting improper labels from the path of movement of articles having proper labels thereon.

5. In a machine of the class described, a support having a top plate with an opening therein, a stage mounted below the top plate and guided for up and down movements, springs means for urging the stage upwardly at its ends, stage roller shafts mounted on the stage and means for driving the same, at least one of said shafts being located beneath the opening, axially spaced first stage rollers upon each of said shafts for advancing articles between the stage and top plate and past said opening, said machine having an outlet which the labeled articles pass, rollers mounted at the bottom of the top plate between the opening and the machine outlet for engaging the upper surfaces of passing articles, a punch housing extending above the top plate and having punch driving means associated therewith, a punch reciprocable in said housing by the action thereon of the punch driving means whereby the punch is moved from a position above the top plate downwardly through the opening, a roller on the punch and a first driven center stage roller on the said one stage roller shaft, said punch and center stage rollers being aligned with their axes in a plane extending through the opening whereby the punch in its lowermost position presses a severed label upon an article against the counterpressure of the stage rollers and therewith moves the stage against the action of its spring means and being effective to facilitate the advancement of the severed label with the article away from said opening, and additional driven center stage rollers on others of said shafts and aligned along the path of article movement with said punch and first center stage roller.

6. In a machine of the class described, a top plate having an upper face, means for feeding a label strip along the upper face of said top plate in a predetermined direction, a punch mounted for reciprocation through an opening in said top plate thereby to deliver a label therethrough, a label plate extending from the punch for holding the label strip against the top plate, a shaft fixed relative to the guide plate and extending transversely to said direction of feeding of the label strip and located in spaced relation to said upper face of the top plate and to said punch, said label plate having arms with notches therein opening toward the top plate for embracing said shaft whereby to determine the position of the label plate relative to the punch, and means for advancing articles beneath the top plate and past said opening for receiving the delivered labels, said label plate extending from said shaft toward the punch and being removable as a unit by disengaging the notched arms from said shaft.

7. A machine as in claim 6, in which the label strip feeding means comprise shuttle bars reciprocal along the top plate and having lugs thereon for engaging apertures in the label strip, said label plate has openings therein, and balls in said openings for being moved away from the top plate by the lugs during a return stroke of the shuttle bars and for moving toward the top plate when the lugs have passed whereby to position the label strip for engagement by the lugs during the succeeding forward stroke.

8. A machine as in claim 6, in which a manual label feeding roller is mounted on said shaft between the arms of the label plate, and in which the shaft has reduced portions for receiving the walls of the notches whereby the manual label feeding roller is held in position on said shaft.

9. A machine as in claim 6, in which the manual label feeding roller has a central opening larger than the shaft whereby the roller can move toward and from the top plate independently of the shaft.

10. A machine as in claim 6, in which the notches of the label plate arms are larger than the shaft, and the label plate extends to a point adjacent the punch and has a beveled edge whereby punch contact therewith can cause a lengthwise movement of the label plate.

11. A machine as in claim 6, in which the label plate has a beveled lower surface extending from the end adjacent the shaft whereby the said end of the label plate is spaced from the guide plate for a part of its length equal to several label area distances along the strip for reception of a fresh label strip.

12. A machine as in claim 6, in which the said label plate comprises a body portion for cooperation with the label strip and a separate end portion comprising the said notched arms, and adjustable means for securing the body and end portions together thereby to adjust the position of the label plate relative to the punch.

13. In a machine of the class described, a top plate having an opening, means for feeding a label strip along one surface of the top plate toward the opening, a punch mounted for reciprocation through the opening, a punch housing connected to the top plate for guiding the punch in its movement, means for advancing articles below the top plate and past the opening, a label plate for holding the label strip against the top plate and comprising a body portion and an end portion, means on the top plate for engagement by the said end portion and permitting movement of the label plate toward and from the punch, and means for securing the body and end portions together with an end of the body extending into the housing to a point closely adjacent the punch, the said end of the body having a bevel whereby punch contact therewith will cause the label plate to be moved from the punch path.

14. In a machine of the class described, a support including a plate having an opening, means for advancing articles past said opening for label application and including a spring-pressed stage having driven rollers thereon beneath said opening, a punch housing on said support at above said opening, means for feeding a strip of labels toward said opening and into the housing, a punch in the housing and having a pair of spaced bars extending parallel to the direction of article advancement, an eccentric cam mounted in the housing and located between the bars for reciprocating the punch during rotation of the cam, means for rotating the cam, the punch during movement in one direction being effective to detach and apply the end label area of the strip to an article passing said opening, and rollers carried by the punch in its movement for pressing the label area upon the article against the counterpressure of the stage rollers and therewith move the stage against the action of its springs, and being effective to facilitate the advancement of the label area with the article away from said opening.

15. In a machine of the class described, comprising a top plate having an opening, means for advancing articles beneath the top plate and past said opening and including a spring-pressed driven roller, means for feeding a strip of labels over the top plate and to said opening, a punch housing extending above the top plate and fixed relative thereto, die plate means fixed relative to the top plate and having an upper surface flush therewith, said die plate means being located at said opening, a punch vertically slidable in the housing and cooperative with the die plate means for severing label areas from the strip, vertically spaced horizontal bars fixed on the punch, an eccentric cam of circular section occupying the space between the bars and effective for moving the punch, and a roller mounted on the punch and moving therewith, the lowermost surface of the roller being located for engaging the label when severed and moving said label through the opening and pressing said label upon an article and pressing the label and article against said spring-pressed roller for depressing the latter, said punch-mounted roller being effective to reduce the friction between the label and punch while the spring-pressed driven roller is depressed and active for advancing the article.

16. A machine as in claim 15, in which the label feeding means includes shuttle bars movable along the top plate, the punch has vertical grooves aligned with the shuttle bars, and the die plate means has grooves for the passage of the shuttle bars, whereby the ends of the shuttle bars may project beyond the cutting edge of the die plate means and into said grooves.

17. A machine as in claim 15, including a vertically sliding device for wetting the article preparatory to receiving the label, guide means on the punch housing for the slidable device, a lever journalled on the punch housing for moving said sliding device, and a second cam fixed on said shaft outside the punch housing for moving said lever.

18. In a machine of the class described, a support including a first plate with an opening, means on the support for advancing articles at one surface of the first plate and past said opening for label application thereto, means for feeding a strip of labels along the support at the opposite surface of the first plate and across said opening, a punch housing on the support and extending into the opening, a punch and means for moving it in the housing for severing labels from the strip and applying the labels to advancing articles, a roller journaled on and carried by the punch for pressing a severed label against an advancing article, the housing having an aperture into which the label strip is fed for engagement by the punch, said housing having foot portions located beneath the aperture, and die plate means secured to said foot portions and located thereby in alignment with one surface of the said first plate for guidance of the label strip, said die plate means being positioned for cooperation with said punch during its severing movement.

19. In a machine of the class described, a support along a surface of which articles are to be advanced to and past an opening in the support, means for advancing the articles and including a spring-pressed driven roller at said opening, means for feeding a strip of labels along the support at the opposite surface thereof and to said opening, a punch mounted on the support for movement through the opening and effective for severing a label from the strip and delivering the severed label to an advancing article, and a roller journaled on and moving with the punch for pressing the severed label against the article advancing on said driven roller, said driven and punch rollers being aligned in the direction of punch movement whereby the label and article are pressed between them.

20. In a machine of the class described for employment with strips of labels of which some are proper for application to articles and others are improper, a plate, a stage mounted at one face of the plate and spring means for urging the stage toward the plate, said plate having an opening opposite the stage, a driven roller on the stage for advancing articles therealong and past the opening, article controlling means for preventing advancement of the articles, means for feeding a label strip along an opposite face of the plate and across the opening, a punch mounted at said opposite side of the opening and means for reciprocating the punch with a stroke toward and through the opening for severing a label from the strip and pressing the label against an article on the stage, a roller carried by the punch and aligned with the said stage roller whereby the punch acts during the pressing to cause the stage to move away from the plate, a device for selecting between proper and improper labels as the labels successively reach the opening, means responsive to the selecting device for causing the article controlling means to release an article for advancement to the opening when a proper label is present for application thereto and for causing the article controlling means to detain the articles when an improper label is presented to the selecting device, said responsive means also including a device for causing a punch movement when an improper label reaches the opening whereby the improper label is severed and delivered to the stage roller in the absence of an article, and the driven stage roller and the punch roller are effective to remove the severed improper label from said opening.

21. In a machine of the class described for employment with strips of labels of which some are proper for application to articles and others are improper, a plate, a stage mounted at one face of the plate and spring means for urging the stage toward the plate, said plate having an opening opposite the stage, a driven roller on the stage for advancing articles therealong and past the opening, article controlling means for preventing advancement of the articles, means for feeding a label strip along the opposite face of the plate and across the opening, a punch mounted at said opposite face of the opening and means for reciprocating the punch with a stroke toward and through the opening for severing a label from the strip and pressing the label against an article on the stage, a roller carried by the punch and aligned with the said stage roller whereby the punch acts during the pressing to cause the stage to move away from the plate, a device for selecting between proper and improper labels as the labels successively reach the opening, means responsive to the selecting device for causing the article controlling means to release an article for advancement to the opening when a proper label is present for application thereto and for causing the article controlling means to detain the articles when an improper label is presented to the selecting device, said responsive means also including a device for causing a punch movement when an improper label reaches the opening whereby the improper label is severed and delivered to the stage roller in the absence of an article, and additional driven rollers on the stage downstreamward of the opening in the direction of article movement for engagement with the severed and delivered improper labels for engaging and causing the severed improper labels to be carried along and ejected from the machine.

References Cited by the Examiner
UNITED STATES PATENTS

| | | |
|---|---|---|
| 1,361,970 | 12/1920 | Dickey. |
| 2,191,535 | 2/1940 | McNeill _____ 216—22 |
| 2,754,022 | 7/1956 | Schneider _____ 216—28 |
| 3,010,864 | 11/1961 | Schneider et al. _____ 156—64 |

EARL M. BERGERT, *Primary Examiner.*

GEORGE NINAS, *Examiner.*